US011328375B2

(12) United States Patent
Egenthal

(10) Patent No.: US 11,328,375 B2
(45) Date of Patent: May 10, 2022

(54) AUTOMATED SYSTEM AND METHOD FOR CROWD SOURCE-BASED MEDIATION/LITIGATION MANAGEMENT

(71) Applicant: SQUABBLE INTERNATIONAL, INC., San Diego, CA (US)

(72) Inventor: Michael Adam Egenthal, San Diego, CA (US)

(73) Assignee: Squabble International, Inc., San Diego, CA (US)

( * ) Notice: Subject to any disclaimer, the term of this patent is extended or adjusted under 35 U.S.C. 154(b) by 711 days.

(21) Appl. No.: 16/147,632

(22) Filed: Sep. 29, 2018

(65) Prior Publication Data

US 2019/0102848 A1 Apr. 4, 2019

Related U.S. Application Data

(60) Provisional application No. 62/566,058, filed on Sep. 29, 2017.

(51) Int. Cl.
*G06Q 50/18* (2012.01)
*H04L 67/12* (2022.01)
*G06Q 20/32* (2012.01)

(52) U.S. Cl.
CPC ....... *G06Q 50/182* (2013.01); *G06Q 20/3223* (2013.01); *H04L 67/12* (2013.01)

(58) Field of Classification Search
CPC .................................................. G06Q 50/182
See application file for complete search history.

(56) References Cited

PUBLICATIONS

Stuehr, 8 top mobile apps for mediators (Year: 2013).*
Mediate2Go (Year: 2017).*

* cited by examiner

*Primary Examiner* — Aryan E Weisenfeld
(74) *Attorney, Agent, or Firm* — Mintz, Levin, Cohn, Ferris, Glovsky and Popeo, P.C.

(57) ABSTRACT

A system and method for semi-automatic conflict resolution management and communication, achieved by hosting a mediation and management application on a cloud-networked server. The application presents via an app or web-link, an input screen to a complainant's device and uploads the complainant's conflict information to the server. The complainant can also e-file the law suit immediately, or after a pre-determined period of time has passed. The defendant is electronically notified of the impending law and offered an option for mediation through the application; and also an option to counter-claim, using the application's interfaces. If the defendant accepts the mediation option, then a certified mediator (likely crowd-sourced) engages the parties and begins negotiations through the application, to arrive hopefully at a settlement. All of these exchanges are managed by the application and performed through the digital devices by the parties and mediator, without requiring involvement of a traditional court process.

20 Claims, 14 Drawing Sheets

SQUABLEE EMAIL

START SQUABBLING

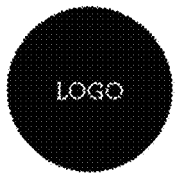

YOU'VE BEEN SQUABBLED!
SOMEONE IS THINKING ABOUT FILING A LAWSUIT AGAINST YOU!

YOUR REFERENCE CODE IS     55GHK79QZ

Someone is trying to save themselves and YOU from jumping through all the hoops of the US legal system. Squabble is THE WAY to settle disputes outside the courts.
In fact, if you Squabble "YOU CAN FORGET THE COURTS."

WHY USE SQUABBLE?

- Squabble is FREE to Squabblees (YOU)
- If you don't Squabble, you are likely to be summoned to appear in court.
- Dispute could be over in 1 day (NOTE - average small claims disputes take 90 days)
- Offers to settle are inadmissible in court.
  (so anything you say CAN'T be used against you.)

IF YOU DON'T SQUABBLE:
- You WILL be served with a lawsuit.
- You lose a day's pay
- You wait in line in the a.m.
- You must file and pay for your own brief in court
- You must prepare an argument and litigate the issue in court in front of a magistrate

START SQUABBLING
You can settle the dispute in three steps:
- Download App
- Fill out "Squabblee's Answer"
- E-sign a binding contract

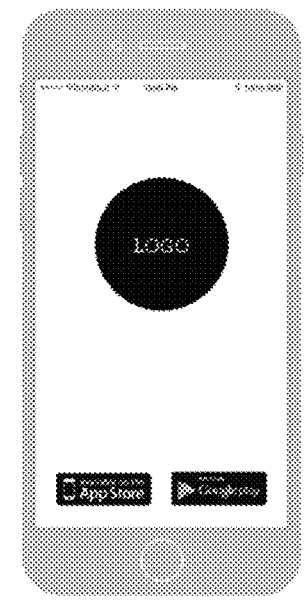

This is your timeline before Squabbler files a lawsuit. Squabble NOW before it's court time.

COUNTDOWN CLOCK (SQUABBLER'S PROVIDED TIME)

START SQUABBLING

*FIG. 7A*

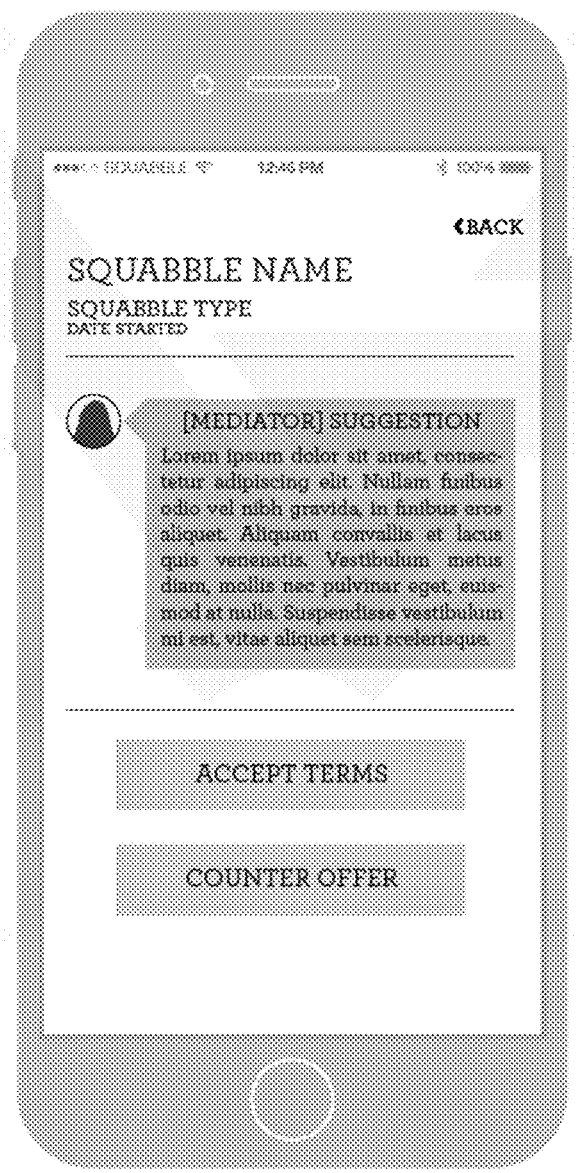 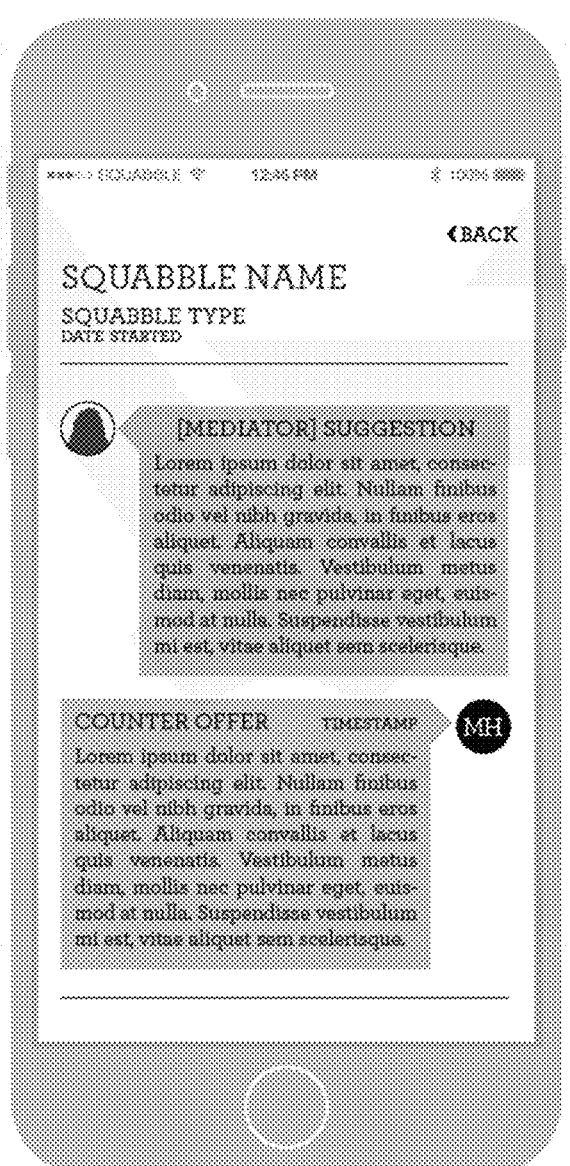
*FIG. 9A*      *FIG. 9B*

ант; uploading the input information into the one or more cloud-networked servers; forwarding at least one of an email, text message, phone call, and format for a letter to be mailed or officially served, a notice of the impending law suit to the defendant with the at least one pre-determined period of time or date of the e-filing, and digitally presenting an option to have the impending law suit mediated through the application, if the mediation option is selected by the defendant, then: presenting a digital conflict response interface to the defendant, wherein response information is input by the defendant; uploading the response information into the one or more cloud-networked servers; presenting a digital option to counter-claim against the complainant; posting in a digital private list, a summary of the uploaded information, wherein mediators can electronically review at least the summary and complete facts of the case; receiving a case selection by a mediator; and providing digital communication interfaces between the mediator and the complainant and between the mediator and the defendant on their respective devices, to facilitate a settlement between parties, wherein communication between the complainant and defendant is not permitted through the application.

AUTOMATED SYSTEM AND METHOD FOR CROWD SOURCE-BASED MEDIATION/LITIGATION MANAGEMENT

CROSS-REFERENCE TO RELATED APPLICATION(S)

This application claims the benefit of U.S. Provisional Patent Application No. 62/566,058 filed Sep. 29, 2017, the contents of which is hereby incorporated by reference in its entirety.

BACKGROUND

Field

This disclosure relates generally to conflict management. More particularly, this disclosure relates to an semi-automated, alternative mediating system for parties contemplating small claims legal action.

Background

Research has shown that only a small percentage of persons with disputes (e.g., under $10,000) actually use Small Claims Court to address their legal disputes. Due to the expense, anticipated time to complete, and assumed complexity of going to Small Claims Court, the vast majority opted for no action. Therefore, mediation, either through Small Claims or separate agreement, is not pursued. Also, separate mediation venues are not well suited or easily accommodated for parties with small financial stakes. The difficulties associated with Small Claims Court and/or mediation are based on antiquated person-to-person forums and processes, none of which have taken advantage of modern smart devices and their abilities.

Therefore, there has been a long-standing need in the legal field for a convenient system or method that reduces the preliminary legal hurdles for the novice. Various aspects of such a system and method are described below, using crowd-sourcing capabilities facilitated through modern devices such as smart phones, apps, and the like.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

In one aspect of the disclosed embodiments, a method for semi-automatic conflict resolution management and communication is provided, comprising: hosting a mediation and management application on one or more cloud-networked servers; presenting via at least one of a downloaded app and web-link, a digital conflict input interface to at least one of a smart device and computer to a complainant; receiving via the digital conflict input interface, information of the complainant's identification data from the complainant, conflict incident data from the complainant, and defendant identification data from the complainant, wherein the input information presents a case for an impending law suit, and wherein the digital conflict input interface includes an option to have the law suit automatically e-filed into a court's server by the application after at least one of a pre-determined period of time or date designated by the complain- In another aspect of the disclosed embodiments, the above method is provided, further comprising providing a digital settlement template to the mediator, upon settlement by the parties; and/or wherein the digital conflict input interface includes an option to have the law suit automatically e-filed into a court's server by the application after a pre-determined period of time designated by the complainant; and/or wherein the mediator is from a pool of crowd-sourced mediators; and/or further comprising compensating a mediator depending on proceeds from the settlement; and/or comprising managing payment of the settlement through the application; and/or comprising: automatically assigning the case into one of three tiers based on a monetary amount requested by the complainant; and automatically designating mediators with different levels of qualifications to different tiers; and/or wherein a mediator's compensation is based on the tier of the case; and/or comprising providing a validation of one or more of the input information; and/or wherein if the defendant options to counter-claim against the complainant, then: presenting via at least one of a downloaded app and web-link, a digital counter-claim input interface to at least one of a smart device and computer to the defendant; receiving via the digital counter-claim input interface, information of the counter-claim incident data from the defendant, wherein the counter-claim input information presents a case for a counter-claim law suit; uploading the counter-claim input information to the one or more cloud-networked servers; and notifying the complainant of a counter-claim via an electronic notification interface to the complainant; and/or wherein if the defendant selects the mediation option offered by the application by the pre-determined period of time or date, then not e-filing the input information as a formal law suit into the court's server by the application; and/or wherein after the e-filing, sending a second notice indicating the filing of the law suit to the defendant and digitally presenting an additional option to have the filed law suit mediated through the application; and/or wherein if mediation is successful and a settlement is reached, then e-filing a dismissal of the law suit into the court's server; and/or wherein the court is a small claims court.

In yet another aspect of the disclosed embodiments, a semi-automatic conflict resolution management and communication system is provided, comprising: means for hosting a mediation and management application on a network cloud; means for presenting a digital conflict input interface to at least one of a smart device and computer to a complainant; means for receiving information of the complainant's identification data from the complainant, conflict incident data from the complainant, and defendant identification data from the complainant, wherein the input information presents a case for an impending law suit; means for receiving at least one of a time period or date from the complainant for automatically e-filing the case into a court's server by the application; means for uploading the input information to the one or more cloud-networked servers; means for providing notice of the impending law suit to the defendant and at least one of the time period or date of the e-filing, and digitally presenting an option to have the impending law suit mediated through the application, if the mediation option is selected by the defendant, then: means for inputting response information by the defendant; means for uploading the response information into the one or more cloud-networked servers; means for presenting a counter-claim option against the complainant; means for providing a summary of the uploaded information, wherein mediators can electronically review at least the summary and complete facts of the case; means for selecting a case by a mediator; and means for communication between the mediator and the complainant and between the mediator and the defendant on their respective devices, to facilitate a settlement between parties, wherein communication between the complainant and defendant is not permitted through the application.

In another aspect of the disclosed embodiments, a semi-automatic conflict resolution management and communication system is provided, comprising: a cloud-networked server hosting a mediation and management application; a complainant's computerized device running a first device-side interface of the application, wherein information input by the complainant of a potential law suit between the complainant and a defendant and at least one of a desired time period or date to e-file the law suit, is forwarded to the server; the defendant's computerized device running a second device-side interface of the application, wherein a notification of the potential law suit, the at least one desired time period or date of the law suit's e-filing, a first response option to proceed with mediation, and a second response option to counter-claim against the complainant is provided to the defendant via the second device-side interface; a mediator's computerized device running a third device-side interface of the application, wherein information of the potential law suit, the complainant, and the defendant are viewable via the third device-side interface, and wherein the third device-side interface contains communication windows between the mediator and the complainant and between the mediator and the defendant, wherein communication information between parties is forwarded to the server.

In yet another aspect of the disclose embodiments, the above system is provided, further comprising a digital private list of a summary of the potential law suit, the list being viewable on the third device-side interface; and/or wherein the first device-side interface includes a timeline option to file a law suit for selection by the complainant; and/or wherein the mediator is from a pool of crowd-sourced mediators; and/or wherein if the defendant elects to counter-claim, the second device-side input interface further comprises a digital counter-claim input interface, wherein counter-claim input information by the defendant is uploaded to the one or more cloud-networked servers and the complainant is electronically notified of the counter-claim via the application.

BRIEF DESCRIPTION OF THE DRAWINGS

FIG. 7A is a screen shot of an exemplary notification page to the Defendant/Squabblee via email.

FIG. 9A is an illustration of a screen shot of a suggested offer shown to the either the Squabbler or Squabblee, with a comment window from the Mediator.

FIG. 9B is an illustration of a screen shot of a follow-negotiation page listing the counter offer.

DETAILED DESCRIPTION

Legal conflict resolution typically involves a lawsuit between the disputing parties. In some situations, mediation can provide the desired resolution without incurring the excessive costs associated with formal lawsuits. However, both approaches are difficult to utilize for parties that are not armed with lawyers.

With the proliferation of smart devices and networking resources, the ability to crowd-source talent to solve specialized problems that were only solvable by dedicated enterprises is now a burgeoning force in the marketplace. For example, taxi services were once solely the realm of dedicated taxi companies, but with crowd-sourcing and using the capabilities of smart devices, any pre-qualified driver within the vicinity of a customer can be a "taxi-for-hire."

Recognizing that mediation often is the preferred venue for small claims litigants, the inventor recognized the "on-demand" service model can also be applied to modernize the antiquated and traditional approach used in legal disputes.

Specifically, a software-based system connected to smart devices (herein after called Squabble, trademarked by the inventor) has been developed to easily allow small claim disputes to be timely, efficiently mediated with just a few clicks of a button. The ability to resolve potentially acrimonious disputes that usually drag on for months and months, or incur the traditional exorbitant legal fees is a game-changer in the legal dispute market. Consequently, an entire sector of legal disputes for the average person that would otherwise not have been pursued, because of the high barrier to entry/resolution, can now be "App" managed through the inventor's system and method.

In one or more of the embodiments described below, Squabble is a semi-automatic conflict resolution mediation and management application platform that can also operate as an e-file facilitator to enable a would-be plaintiff to forgo a lawsuit and use the application to resolve his or her dispute digitally, through a trained and certified, crowd-sourced mediator. The convenience of this system is evident for people that do not want the hassle of filing in a Small Claims Court, including managing the paperwork, navigating the court's rules, and appearing before a judge. In various embodiments, the Squabble system is capable of mimicking a traditional mediation process, but significantly reduces the required time and effort typically expended by leveraging wide-spread smart devices. In the event a mediation cannot be agreed to by either party, an exemplary embodiment can act as a Small Claims e-file facilitator, and even allow the party to re-enter the mediation process, if so desired. The following figures and details provide examples of various embodiments of the Squabble system/method.

Figure 1:
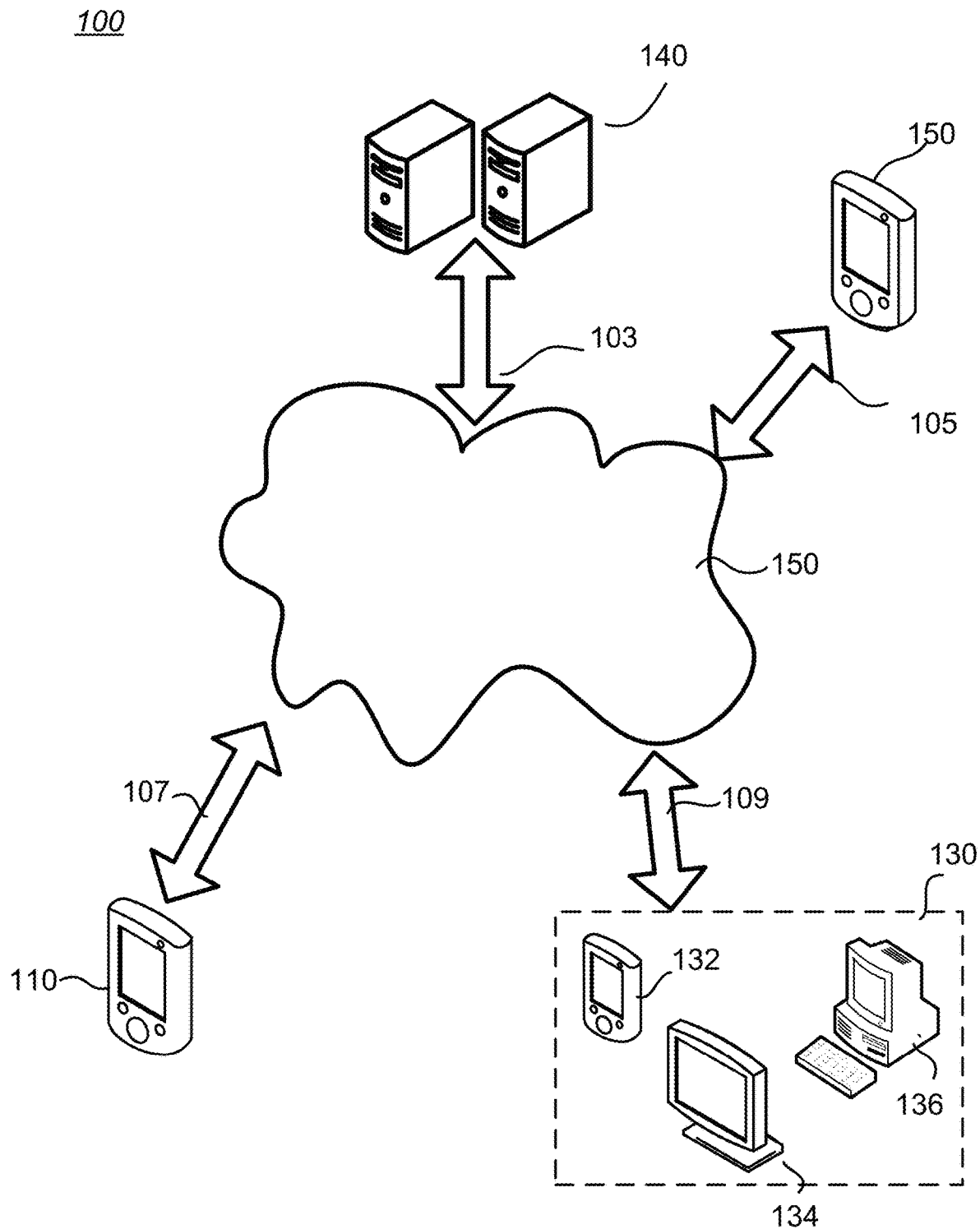
FIG. 1 is a block diagram showing high level connections between various devices within an exemplary embodiment configuration.

FIG. 1 is a block diagram 100 showing high level connections between various devices within an exemplary embodiment configuration. For example, one or more server(s) 140 connected 103 to a network cloud 150 (for example, the Internet) with secondary connection 107 to a $1^{st}$ party's smart device 110 running an exemplary embodiment via a software application/app (e.g., Squabble). The $1^{st}$ party's smart device 110 can be a phone, watch computer, glasses computer, virtual reality computer, notebook, tablet, computer, or any device capable of performing software execution and interfacing with the user. If a phone or equivalent, cell networks (not shown) can act as a bridge to the network cloud 150. Network 150 also is connected 109 to a $2^{nd}$ party's hardware 130, shown here as potentially comprising several different types of hardware, for example, smart phone 132, terminal 134, desktop computer 136, and so forth. It should be understood that other types of devices may be utilized, for example, of the types described above for the $1^{st}$ party. It should also be understood that $1^{st}$ party and/or $2^{nd}$ party may consist of several parties (e.g., multiple plaintiffs/defendants), depending on the matter being mediated, each with their own login device or login account.

Mediator device 150 is similarly connected 105 to the server(s) 140 via Network 150 to $1^{st}$ and $2^{nd}$ parties. While FIG. 1 illustrates the mediator's device as a smart device or smart phone, it is understood that it can be any device capable of performing functions similar to a computer, having communication capabilities to the server(s) 140.

The various devices or connection described above are understood as portals or access points for engaging the Squabble application, therefore other devices that provide access may be utilized. That is, for example, the $1^{st}$ party may use a "different" device (e.g., tablet—not shown) after using device 110, by using the same account login information that he/she utilized on device 110. Therefore, it is envisioned that a given party can transition to different devices (hardware platforms), if so desired, during the course of the Squabble process.

The server(s) 140 are loaded with server software that supports the Squabble app that is running on the $1^{st}$ party's device 110 and also on the $2^{nd}$ party's device 130 (as well as for the mediator). The Squabble app can be downloaded from a link or available at an app store. Alternatively, a login through a web interface may be utilized, as well as any other well known method for logging into an application.

Figure 2:
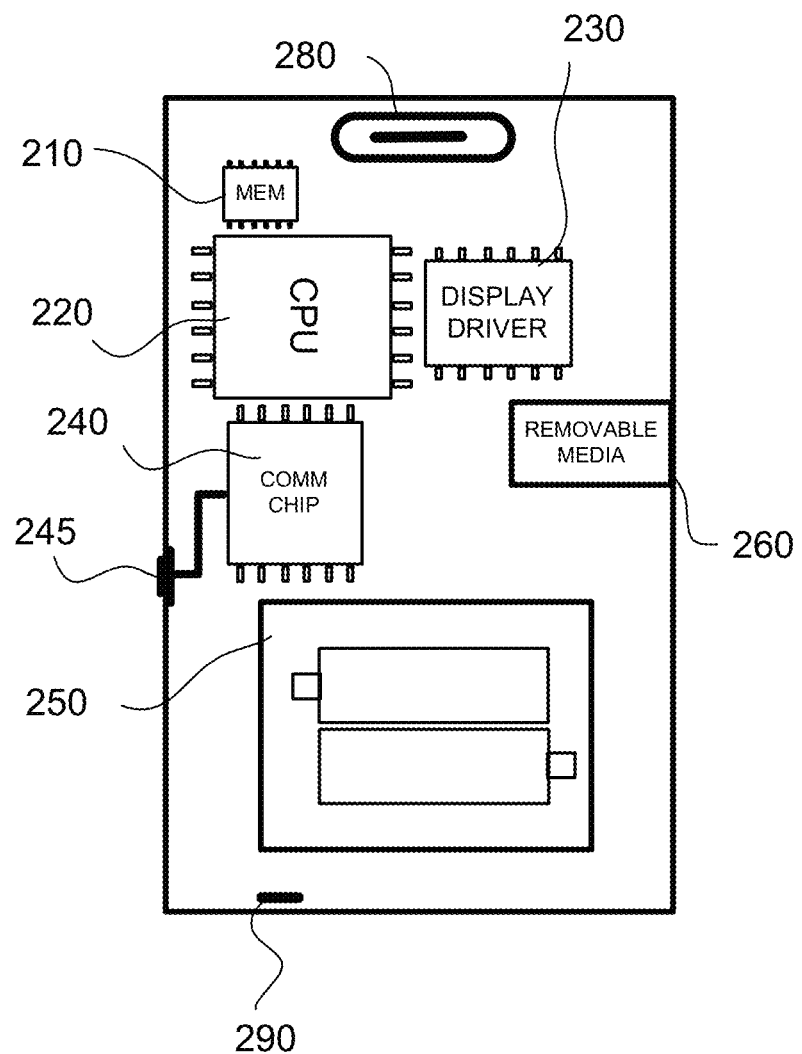
FIG. 2 is an illustration of various hardware elements typically used in mobile smart device or smart phone or mobile personal computer.

FIG. 2 is an illustration of various hardware elements typically used in mobile smart device or smart phone 200 or mobile personal computer. Depending on the sophistication of the hardware elements, the mobile smart device 200 can be made to be equivalent to computer, being miniaturized for portability. As a computing device, mobile smart device 200 will contain processor 220, memory 210, display driver 230, communications chip 240 connected to external interface 245, optional removable memory medium 260 and external interface 245 which may take the form of a IN/OUT port or an antenna for wireless transmission. Also illustrated is power source 250, speaker 280 and microphone 290, some of which may not be necessary but are shown here for completeness. The processor 220 may also contain on-chip memory (not shown). The removable memory medium 260 is optional and operates as memory storage and can take many forms, such as a USB drive, SD card, floppy disk, CD-ROM, or any conventional removable format for memory that is used in the computer industry.

It is understood that depending on the size of mobile smart device 200, memory 210 may be supplemented with additional memory such as, for example, a hard drive (not shown) either internal to mobile smart device 200 or external to mobile smart device 200. In an external scenario, the external memory (e.g., hard drive(s)) can be arranged to communicate via communications chip 240 or another interface chip.

For larger computer systems, memory will be distributed among hard drives (or an analogous form of external memory—e.g., solid state drives, optical drive, tapes, etc.), the details of which are well known and understood in the industry. In these larger systems, multiple processors 220 may be used and, as the various hardware elements are scaled for higher performance and capabilities, the form factor will also scale upward resulting in the computing device to be tantamount to a desktop computer or server. Accordingly, many of the same hardware elements described in FIG. 2 are found in desktop computers, servers, secondary devices, terminals, and so forth.

As will be appreciated by one skilled in the art, in an aspect of some embodiments of the present disclosure and of the "computer", described in FIG. 2 (and by inference to $1^{st}$ and $2^{nd}$ party devices 110, 130 and server(s) 140, in FIG. 1), may be embodied as an apparatus that incorporates software components. Accordingly, some embodiments of the present disclosure, or portions thereof, may combine one or more hardware components such as microprocessors, microcontrollers, or digital sequential logic, etc., such as processor 220 with one or more software components or "modules" (e.g., program code, firmware, resident software, microcode, etc.) stored in a tangible computer-readable memory device such as memory 210, removable memory media 260, CPU memory (not shown) that in combination form a specifically configured apparatus that performs the functions as described herein. These combinations, when presented as such, can form specially-programmed devices which may be generally referred to herein "modules".

Figure 3:
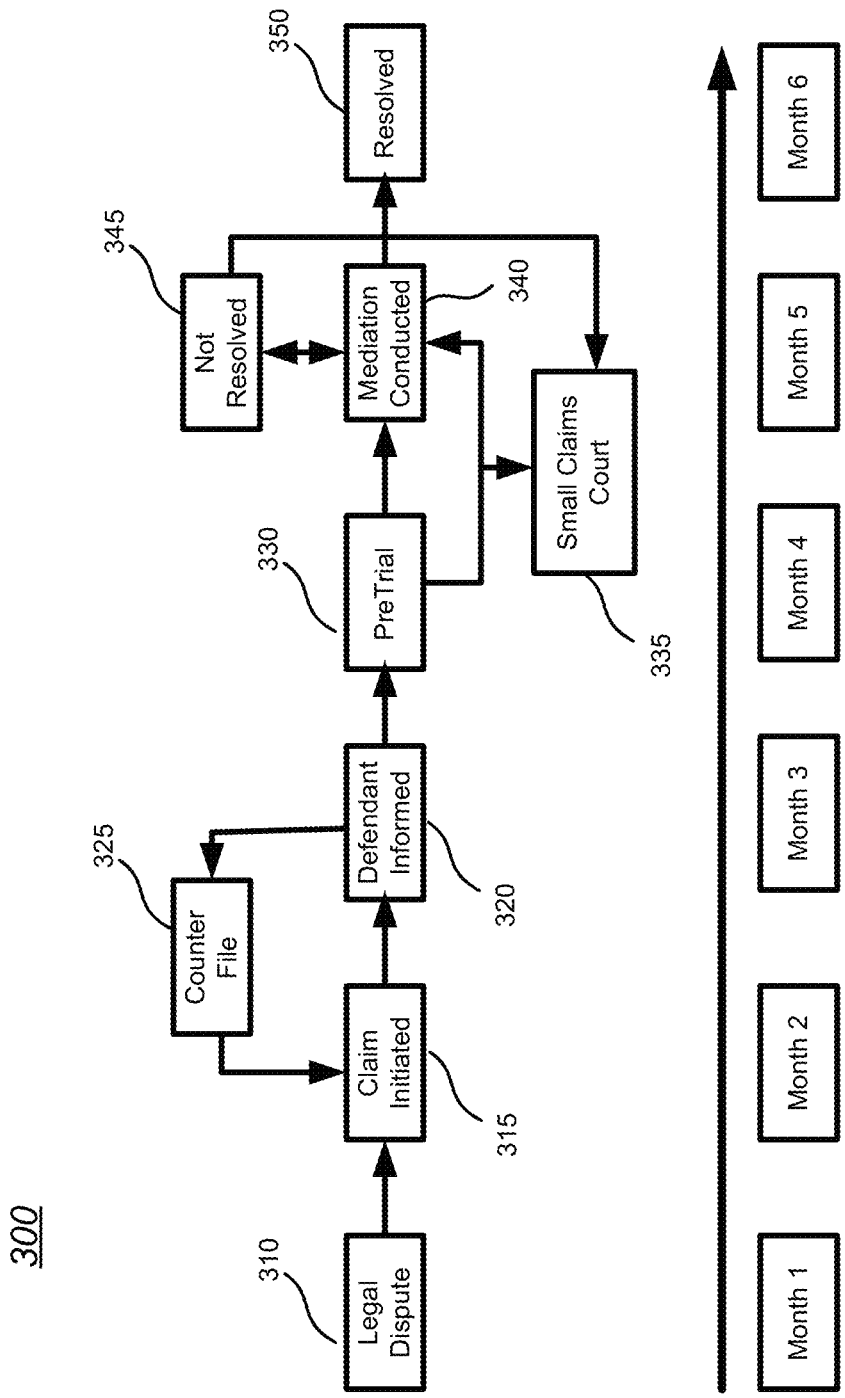
FIG. 3 is a diagram of the conventional, related art steps for pursuing a Small Claims Court action that is mediated.

FIG. 3 is a diagram of the conventional, related art steps for pursuing a Small Claims Court action that is mediated. Since this is a well known process, it will only be briefly described here. Plaintiff having a dispute 310 begins the traditional process by preparing and filing a claim 315, which usually entails a court fee. If the filing is performed by a lawyer, then attendant lawyer fees will need to be paid. All the steps for proper notice must be followed for the Defendant to be informed 320 (also entailing process server fees), who upon receipt may counter file 325. Pre-trial scheduling 330 is set by the court 335 which, more often than not, will require prior mediation 340 between the parties. If mediation is not successful 345, the case is sent to back to the Small Claims Court for adjudication. If mediation is successful, the case is resolved 350. As apparent from the approximate "time line" below the various steps, this traditional process can take up to six months or more, which for the typical small claims litigant is time-prohibitive, not to mention the costs for hiring a lawyer. It has been estimated that nearly 40 million disputes per year are not adjudicated or mediated because of the hurdles involved in the traditional process. An automated and alternative approach is now described.

Figure 4:
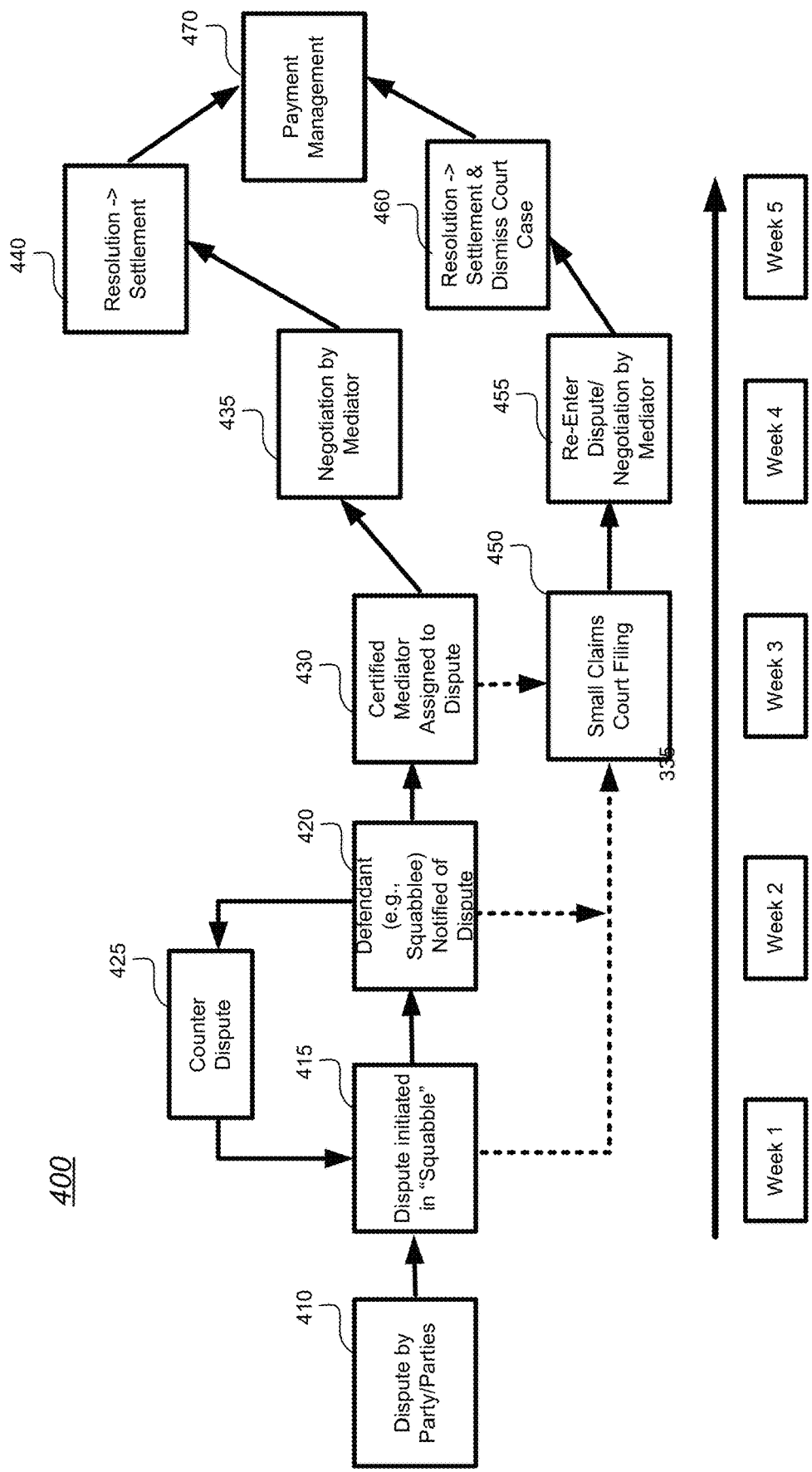
FIG. 4 is a process flow diagram for an exemplary Squabble process.

FIG. 4 is a process flow diagram for an exemplary Squabble process 400. It is assumed here, for the purposes of generalization, that there will be three different types of Squabble actors:

Plaintiff—falls typically into two types of clientele, those that have reoccurring disputes (for example, landlords and business owners) or those with one-time disputes.

Defendant—joins the dispute or even counter-claims against the Plaintiff via a "Counter-Squabble™" (trademarked by the inventor).

Certified Mediator—individuals that are trained to help mediate and resolve the disputes. They are fully independent from the Plaintiff and Defendant. They are "crowd-sourced" in that they can operate as independent contractors (or on a as-needed-basis) and can, in some instances, elect to be the mediator or not, based on their review of the dispute.

The exemplary process 400 starts with a person 410 or persons (corporations, businesses, institutions including government(s) can be considered person(s) for the purposes of this process) having a Small Claims dispute with another party. They can invoke the Squabble application on their smart device or computer, or device running the Squabble application (or alternatively, on a web page with the Squabble interface, and so forth) to officially begin a Dispute 420 with the Defending party. The invoked dispute may be referred to as "the Squabble" in certain circumstances, for ease of reference. The process 400 performs any one or more of account creation, login credentials, identification of the requesting party, optional validation (either upon initiation of the Dispute/Squabble or subsequently thereto), and requests information regarding the Dispute to be provided by the initiating party. It is understood that the information interface will be an electronic or digital interface displayed on the party's device, wherein the input information is uploaded to the hosting server containing the server-side application of the Squabble software.

The initiating party will be referred to as the "Squabbler" for ease of reference. Upon submission of the Squabbler's information and documentation of the Dispute facts, the exemplary process 400 notifies 420 the Defendant of the Dispute. Typically, this will be through an email, text, or in some embodiments, formally through a process server, or otherwise written communication procedure. In some cases, several methods for notifying the Defendant may be utilized. For example, an email and text may be sent, or a combination of email and a letter sent (by the postal service or courier), etc. The type of notification may be "un-official" (i.e., not satisfying local judicial notice rules, for example, an automated phone call) or may be in accordance to the notification rules of the court and therefore, any one more approaches may be utilized. In a prototype embodiment, both a text and an email is sent (if available).

In various embodiments, the notification means (if electronic in form) will have a Squabble-link that the Defendant can click on to be directed to the Squabble information. This may be a summary of the issues being disputed and the cause of action being pursued by the Squabbler. Concomitant with the notification can be a link to open an "account" with the application Squabble so as to participate in the mediation process hosted by the application Squabble. In any event, receipt of the "notification" is requested.

The Defendant (Squabblee), when notified can have the option to either agree to mediate the dispute through the Squabble application or wait to be sued in Small Claims Court. That is, the Squabblee can choose to ignore the Squabble request and deal with the dispute in Court. Or, as discussed above, the Squabblee can join the dispute through the Squabble process 400. Once the Defendant (Squabblee) has agreed and engaged the application Squabble, mediation 435 can be performed for this Dispute. In some instances, the Defendant's response to the Squabbler's allegations may be necessitated and processed before a Squabble certified mediator is assigned. In other instances, the mediator may be assigned at the onset of the Squabble process. In some embodiments, an independent verification process may be invoked by the Squabble application to validate and confirm one or more facts presented by the Squabbler and Squabblee. For example, address, duration of stay (e.g., lease), deposit amounts, credit information and so forth may be interim evaluated for accuracy. In other embodiments, the mediator may facilitate the collection of this information by prompting the party (Squabbler, Squabblee), either via an automatic menu or check list.

Alternatively, the Squabblee may pursue a "Counter Dispute" 425 against the Squabbler, the information of which is forwarded to the mediator and also provided to the Squabbler (following the appropriate "notification" procedure). In this instance, the Squabbler can respond with additional facts/reply to the Squabblee's Counter Dispute which is also forwarded to the mediator. The original Dispute and the Counter Dispute can be joined as a single "case" before the mediator. Depending on the facts, there may be some instances where the counter claim and the original claims may be managed by separate mediators.

It should be understood that at steps 415, 420, and 430, the Squabbler may have the option to bypass the Squabble mediation process and direct-file a claim 450 in the Small Claims Court before proceeding to the next step. For example, a Squabbler may wish to pursue Squabble-based mediation but upon initiating the Dispute through the application Squabble, the Defendant may have performed another act (or lack thereof) to give cause for the Squabbler to seek immediate redress in the court. Thus, as shown by the dashed arrows, the Squabbler may exit out of the upcoming Squabble process steps and request e-filing into the Small Claims Court. Similarly, the Squabblee may be afforded the option in his counter dispute to submit a claim directly into the Small Claims Court. As should be apparent, various situations may dictate different actions by the respective parties, For example, in one scenario, one or more of the parties can come to a "settlement" (through the mediator) and enter it as a stipulated judgment with the court so as to have it recorded with the court's records, thus carrying the weight of affecting the debtor's credit. Of course, other Squabble originated actions for "entering" into the public records may facilitated by design preference.

Nonetheless, once the Squabbler has initiated the Dispute via the application Squabble, exiting to the Small Claims Court does not necessarily terminate the Squabbler (or the Squabblee) out of the Squabble process 400. That is, they can re-enter 455 the process 400 at their discretion, preferably at the same point that they exited from. Of course, in some instances, additional facts or information that have come to light during the co-pending court process may be added to the docket of information provided to the mediator. With the parties returning to the Squabble process, once successful negotiation by the mediator 435 has concluded, a resolution to the Dispute resulting in a "settlement" 440 can be arrived at. If the negotiation is pursuant to "re-entering" 455, and if resolution brings a settlement, a request for dismissal of the suit can be filed in view of the settlement.

Communication between the opposing parties is not permitted through the Squabble platform and communication outside of the Squabble platform is discouraged. All information exchanged between the parties is channeled through the assigned mediator to prevent direct contact between the parties.

Settlement is effected through a Settlement Agreement Generator set into motion by the mediator that both parties sign. Subsequent payment management and monitoring is performed 470. Here, Squabble can act as the payment platform for the settlement funds, thus enabling Squabble to monitor compliance with the settlement payment terms (e.g., installment payment, timeliness of payment, etc.).

It should be evident from the above, that there will be instances where the parties will wish to simultaneously dual-track their dispute both in Small Claims Court and in Squabble mediation to take advantage of the timeliness that Squabble-based mediation can afford. That is, they can attempt to resolve the Dispute in a parallel timeline, using Squabble's mediation as a first-arrived-at solution and if not to the liking of the party(s), then default into the current co-pending "slower" court process. Therefore, for these instances, requesting Squabble to direct-file into the Small Claims Court may not suspend the Squabble process, rather the Squabbler may request the Squabble process to continue with the Court case proceeding in the background (albeit at a significantly slower pace). A different payment scheme may be charged for this option, by the Squabble process. It is imagined that Plaintiffs that genuinely believe they have a legitimate case that deserves its day in court and are not afraid to pursue their cause of action, will use the Squabble process to begin the court-filing process, but use the Squabble mediation as a first choice and resort to the court's process as a fall-back option.

In various embodiments, variations to the above can be instituted in the Squabble process 400. For example, certain steps in the process 400 may have time limits associated with them. That is, if the Squabbler and/Squabblee do not fulfill their obligations with a specified time (e.g., complete a Squabble intake, respond to Dispute, fail to provide information, etc.), a default action may be invoked automatically by the Squabble process 400. As one example, if the Squabbler wants to suspend the Squabble, such an action may not take effect until after a predetermined period of time, e.g., 7 days, allowing the Squabbler an opportunity to reconsider his decision to suspend.

Implicit in the exemplary Squabble process is the understanding that the mediators are critical to the success of the system. Poorly qualified, unsophisticated mediators can result in dissatisfied participants or mediation failure. Additionally, since mediators are crowd-sourced from a pool of pre-qualified mediators, a well developed mediator vetting process to become a Squabble Certified Mediator (SCM) is instituted by the Squabble system. For example, the mediator must have at least a valid law degree or a bachelor's degree, periodic training and testing, feedback from the Squabbler/ee, certain levels of experience (can be claim subject matter dependent—i.e., Landlord-tenant, or Commercial Contract, etc.), proprietary training, and so forth. These factors also contribute to the settlement payment allocation to the Mediators. Higher rankings (e.g., good feedback) by the parties can result in the mediator receiving a greater sum of money from the settlement payout. A retired judge, quick resolution, etc., etc. can result in a higher payout. It is presumed here that compensation for the mediators is directly from the settlement payout. However, in some embodiments, the payment may be an upfront fee (or portion thereof) or a subsequently received fee from a given party. In the matters of compensation, it should be understood that there are numerous and various ways for payment and compensation, which can be allocated from the proceeds to pay the mediator. The above examples are only provided to illustrate some of the more obvious ways and therefore alternative payment schemes that are known to one of ordinary skill in the art are understood to be within the scope of this disclosure.

Figure 5:
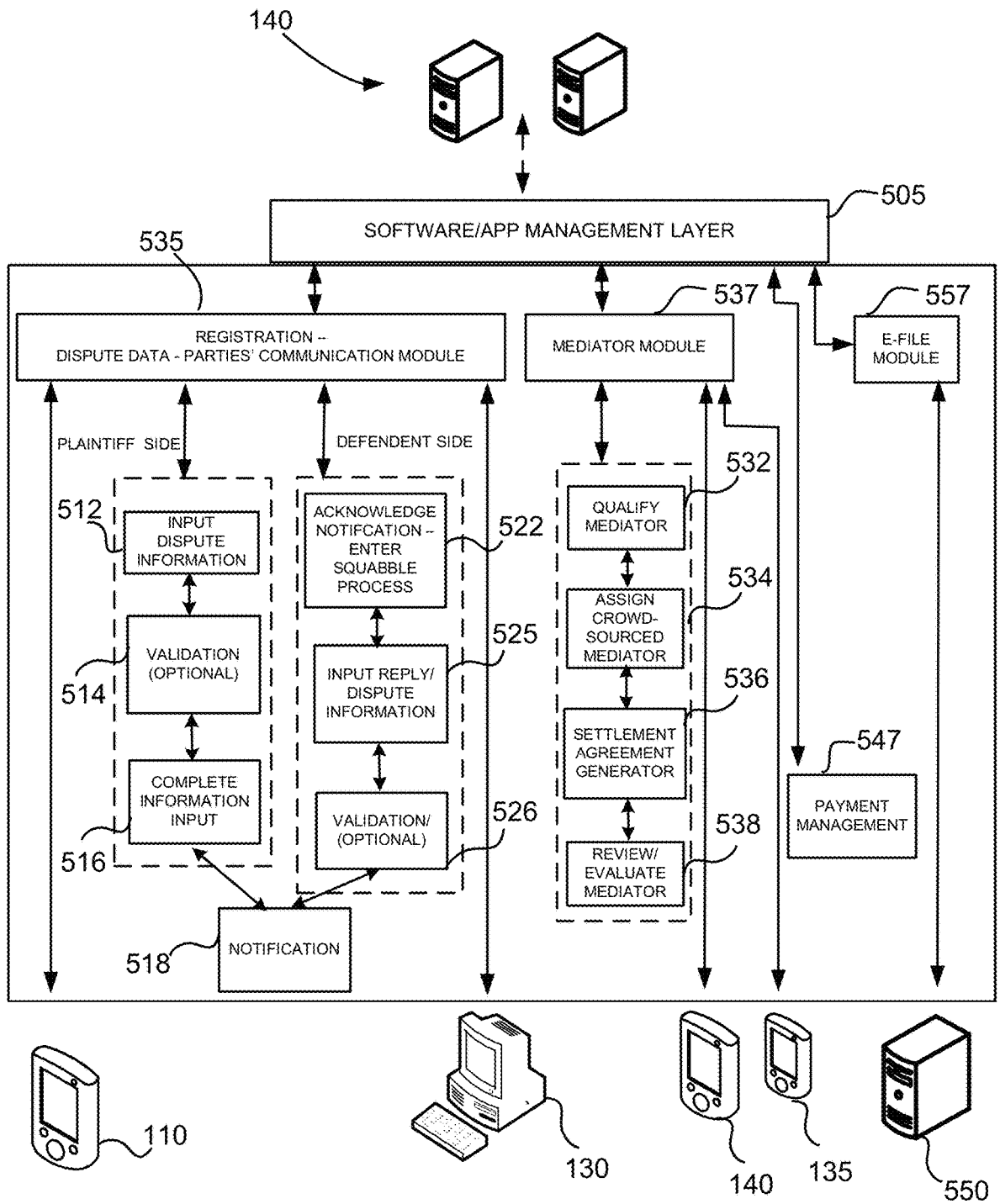
FIG. 5 is a block level diagram showing one possible embodiment of associated hardware and software modules for supporting the Squabble process.

FIG. 5 is a block level diagram 500 showing one possible embodiment of associated hardware and software modules for supporting the Squabble process. The hardware and software modules enable the steps described, for example, in FIG. 4. Squabble server(s) 140 contain Squabble supporting software/app management layer 505. Portions of the Squabble software 505 may reside on the server(s) 140 and portions may be resident on be a target device such as in smart device 110 ($1^{st}$ party—Squabbler), computer 130 ($2^{nd}$ party—Squabblee), smart device 135 (mediator) and so forth. These "portions" or modules of software may be in the form of a downloaded application (e.g., App) or have elements of client-server arrangement. In some embodiments, the bulk of the Squabble software may be resident on the target devices, wherein the server(s) 140 act as a database (or primarily as such) for storing the input information. In other embodiments, portions of the constituent software may be distributed along different devices using appropriate allocation schemes, such as under torrent, block-chain, and so forth protocols.

Additional hardware such as device 135 may correspond to a third party, additional mediator, Squabble administrator, etc. Device 550 represents the "court" server for accepting e-filings. As should be apparent from FIG. 5, one of ordinary skill will understand that various alternative schemes, software modules, devices, device types, etc. may be added or even removed from this configuration, depending on implementation preference and design goal. Therefore, FIG. 5 represents a "basic" configuration whereas different configurations may be utilized to achieve the same or equivalent effect.

Software/app management layer 505 manages registration, data input, communication to other devices 535. After registration, on the Plaintiff side, module 512 provides the prompts for inputting the dispute information. Module 514 may perform validation on the inputted data or off-load the validation to the server(s) 140 (in the latter case, validation information may be accessed from an external source (e.g., credit bureau, property tax records, etc.) that is accessed by the server(s) 140). Next, module 516 provides any final "cleanup" input prompts (for example, requesting the Plaintiff to execute a sworn statement that the facts presented are true and accurate). Module 518 performs the notification to Defendant (and to Plaintiff for a counter-suit) operations. This may include one or more of emailing, preparing a form letter, notifying a process server, texting to the Defendant, etc. In some embodiments, the server(s) 140 may perform the notification to the Defendant.

On the Defendant's side, module 522 processes the Defendant's acknowledgement of the Dispute and if the Defendant accepts the Squabble invitation, will register with Squabble. Module 525 performs the input of the Defendant's reply/submission of facts to the Dispute. Next, module 526 optionally performs validation (or can be off-loaded as in module 514). If the Defendant has a counter claim, reciprocal notification steps may be accomplished by module 518.

With all the pertinent information processed/received by management layer 505, the data of which is stored in server(s) 140, mediator module 537 handles the communication to the mediator. Here, a certified mediator from a pool of pre-qualified mediators 534 enters the Squabble. Their choice to enter the Squabble typically will be based on reviewing a posting of the Squabble in a private list (e.g., Squabble platform) The posting can be a summary of the case information input by the complainant and the defendant, with options for the interested mediator to review additional details.

It should be noted here that mediators are "crowdsourced" having various qualifications, as further discussed herein. Specifically, Certified Squabble Mediators (CSMs) independently download the Squabble app, carry out the requisite training (authored by Squabble), become certified, and can ultimately scroll through a queue of disputes to which they have access and select disputes to mediate. CSMs are independent contractors with Squabble and Squabble is the platform by which they locate disputes to resolve and carry out such resolution.

As multiple mediators may be qualified, they can have the option to "choose" a case to their liking, wherein the selected case will be removed from the list of available cases. In some embodiments, it is conceived that a given segment of the crowd-sourced mediators may be on a "contract" employment basis, therefore, their arrangement may be more restrictive than on the "option-to-choose" basis. For example, a non-desirable case may not be voluntarily chosen by a crowd-sourced mediator and therefore it may be sent to a "contract" mediator (who may be a "tiered" part of the crowd source). In any event, upon joining the case, the mediator performs his mediation duties and upon completion of a successful mediation, invokes module 536 which performs the generation of a settlement agreement. The settlement agreement can be a pre-formulated form agreement, updated with case-specific information.

As is apparent, in some embodiments, more than one mediator may be assigned to a given Squabble. Or, mediators may switch during the process—for example, a "closer" mediator may come into the final stages of the negotiation to handle difficult clients.

In a prototype embodiment, qualifications for a certified squabble mediator (CSM) include one or more of the following:

(1) Be a currently licensed practicing attorney or retired attorney—OR—

(2) Possess a JD from either an ABA accredited or state accredited law school (i.e. those who are not yet licensed)—OR—

(3) Be a currently matriculating law student at either an ABA accredited or state accredited law school—OR—

(4) Possess an undergraduate degree from a four-year institution and be a currently matriculating graduate student (i.e. working towards a PHD, Master's, or MD)—OR—

(5) Possess an undergraduate degree from a four-year institution and possess a graduate level degree other than a JD (i.e. PHD, Master's, MD).

Commensurate with these qualifications, documents that support the qualifications are required, such as:

For practicing attorneys:
  a. State of Licensure
  b. State Bar #

For Holders of JD Degrees who are not Licensed to Practice Law:
  a. Degree Granting Institution (must be either an ABA accredited or state accredited law school)
  b. Copy of transcript For Current Law Students:
  a. Institution Currently Matriculating
  b. A copy of student ID
  c. A copy of transcript For Current Graduate Students:
  a. Institution Currently Matriculating
  b. A copy of student ID
  c. A copy of transcript For Holders of a Graduate Degree:
  a. Degree Granting Institution
  b. Copy of Transcript In the prototype embodiment, the trained mediator approaches the dispute in a seven step process, all of which is through the Squabble software platform (noting here, the mediator's interface and options will be different than for the Squabbler and Squabblee):

A. Selection of Squabble—Three tiers of disputes are presented (which can be adjusted according to design preference), (i) under $2,000, (ii) $2,000-$4,999, and (c) $5,000-$10,000, wherein specific tiers may be limited to specifically qualified mediators (e.g., a novice certified mediator may only be able to select from the first, lower tier). The mediator reviews which Squabbles are not "taken" and selects one.

B. Pre-Contact Review of the Squabble—After selection and approval by Squabble supervisor(s), the mediator reviews the submitted information of the dispute, from a factual and also legal perspective.

C. Mediator Introduction—The mediator introduces him/herself to the respective parties.

D. Opening Messages/communication from Parties—Allow each party to present their side of the story, as additional background information and "emotions" may be more evident in this exchange.

E. Caucuses—Presenting questions to the parties to better understand their concerns. This may take several rounds.

F. Negotiation—Proposals and shuttle diplomacy is implemented to see if a solution can be arrived at. One option is for both parties to authorize the mediator to perform a simultaneous disclosure of a mid-point or range between the parties, where in a party can submit a "real" final offer. Options include the ability to "pause" the "bidding" to review the two offers, and advise the parties of: (a) whether they are reasonably close, (b) a settlement point or range between them, (c) whatever else the parties invent. For example, in one scenario, if the parties agree to a "range" the mediator can identify an agreeable mid-point value, wherein each party will submit a "bid" and the bid closest to the mid-point will be accepted by both parties—and if the parties are equidistant, the mid-point will be accepted.

Returning to FIG. 5, Plaintiff/Defendant module 538 may be invoked which provides review of the case facts, mediation conclusion, etc., by superiors or peers. Module 538 can also operate as a feedback evaluation of the mediator, wherein the Plaintiff/Defendant can respond to a service survey.

Upon successful completion of the mediation, payment management module 547 oversees the financials associated with settlement agreement. This can include periodic reminders to the parties, payment to the mediator, credit/bank processing, and so forth. If mediation is not successful and one or more of the parties pursue their case in Court, e-file module 557 operates to translate their inputted information into a court-friendly format, and submits an e-filing into the respective court's server 550. Notification to the respective parties of the court filing can be achieved through notification module 518, if so desired. Also, payment management module 547 can be invoked to process the e-filing charges against the requesting party.

In view of the above, it should be apparent that while the exemplary embodiments are described in the context of an semi-automated replacement for court-instituted mediation using a crowd sourced mediator, the system can also allow for non-crowd sourced mediators. In this scenario, a certified mediator who is an attorney can, after reviewing the uploaded evidence, render a decision on which the parties agreed to be bound by at the outset of the Squabble.

In an alternate embodiment, it is contemplated that the exemplary process can also allow for the Squabbler, at the outset of the Squabble, or both parties, pursuant to their settlement agreement to have the Squabble Settlement Agreement filed with the court as a Stipulated Judgment and entered with the County Clerk. Such a device could be implemented so the defaulting party has an increased incentive to comply with the terms of the Squabble Settlement Agreement, so as if should one not perform on a Stipulated Judgment, credit agencies are informed.

In another variation, it is possible for the exemplary process to "intake" a party who has already been sued in Small Claims Court so he/she can initiate a Squabble as a Squabblee and attempt to mediate the dispute with the Plaintiff in the Small Claims dispute, who still retains status as the Squabbler. Here, if a settlement is made, the Squabbler could withdraw the suit or have the settlement submitted to the court as a binding agreement.

In yet another variation, Squabble could also allow for parties to announce the resolution of their dispute on various social media sites. On this theme, Squabble could be modified to use social media followers as proxies to a mediator. That is, the dispute would be posted on a social media site (or several) and the "followers" could comment on the dispute and come to a vote on the type of resolution that would be (in the media followers' minds) the appropriate solution. This variation could be effective, for example, in high school settings where peer pressure could be utilized (albeit anonymously) to have the school "community" determine the appropriate resolution.

FIGS. 6-10 are screen shots of various electronically formatted input and output interfaces for an exemplary prototype Squabble program/application as seen on a smart device (e.g., smart phone) or computer.

Figure 6A:
FIG. 6A shows an introductory screen for initiating a "Squabble."

FIG. 6A shows an introductory screen for initiating a "Squabble." The "Squabble" application may be downloaded from a website or be an "app" on the user's device.

Figure 6B:
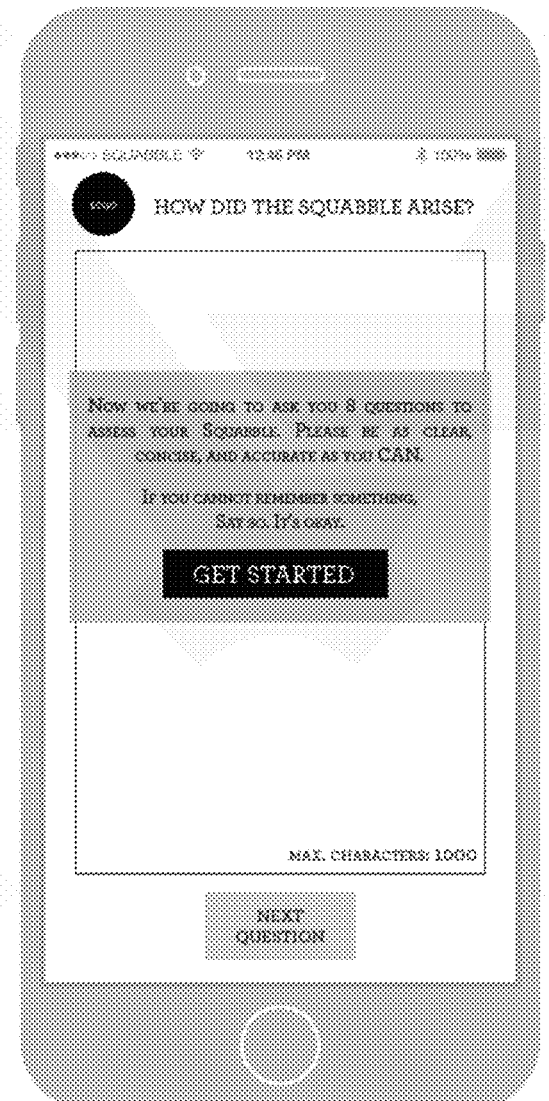
FIG. 6B shows a subsequent screen introducing the fact-submission questionnaire.

FIG. 6B shows a subsequent screen introducing the fact-submission questionnaire.

Figure 6C:
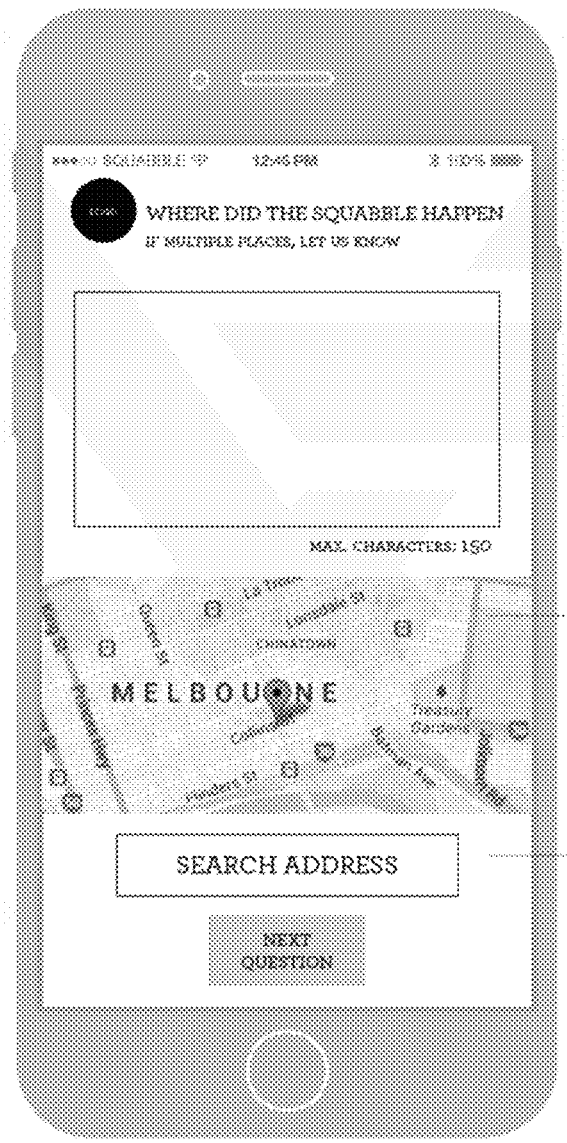
FIG. 6C illustrates a map-based screen for showing the location of the incident.

FIG. 6C illustrates a map-based screen for showing the location of the incident.

Figure 6D:
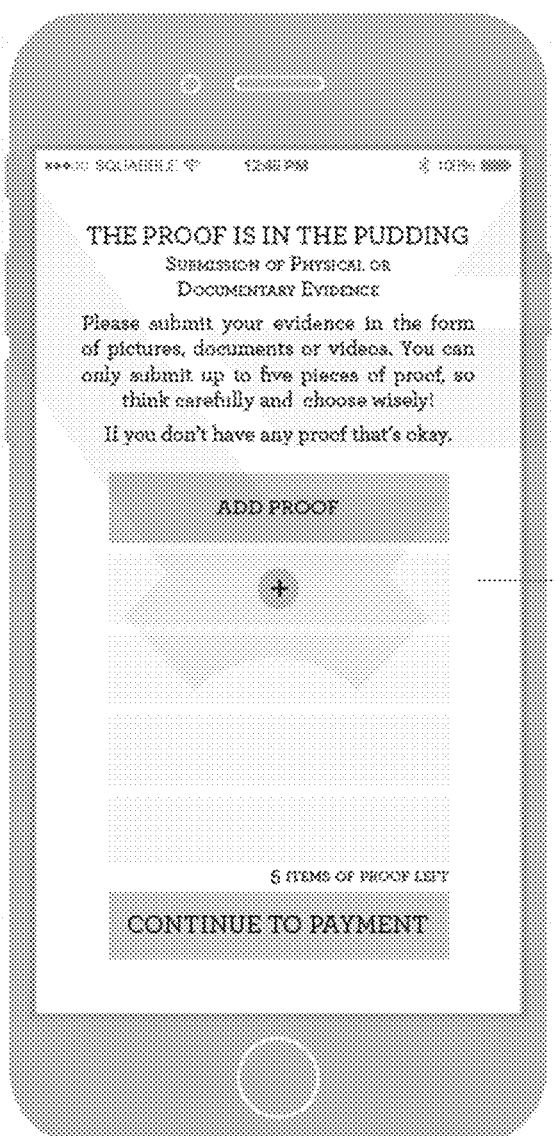
FIG. 6D illustrates an input screen for uploading/inputting "proof" of the dispute facts.

FIG. 6D illustrates an input screen for uploading/inputting "proof" of the dispute facts. For example, a receipt, a lease, photos, etc. may be uploaded into Squabble.

Figure 6E:
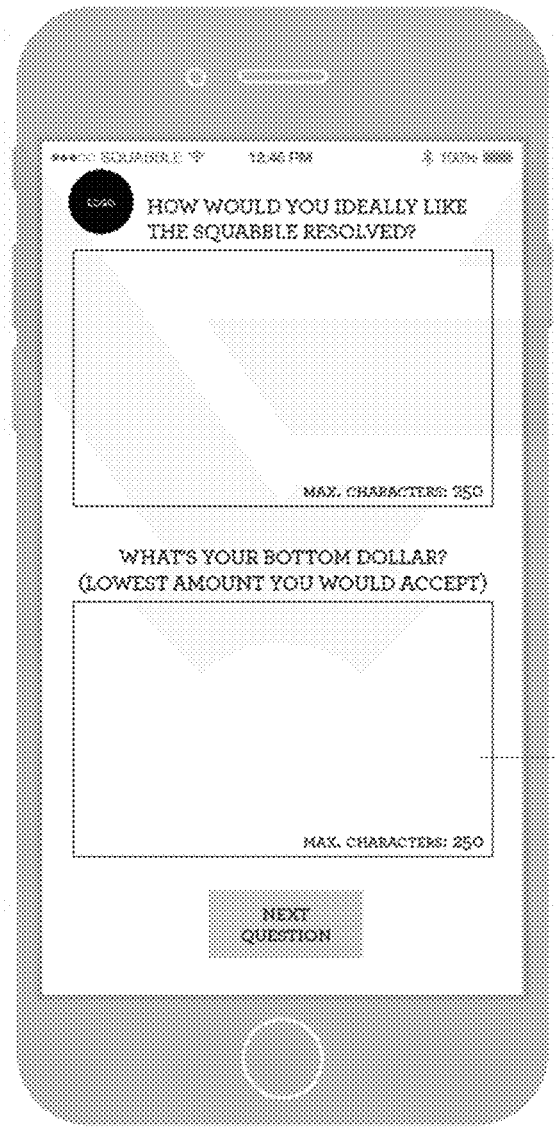
FIG. 6E illustrates screen asking for the terms of resolution with defendant.

FIG. 6E illustrates screen asking for the terms of resolution with defendant.

Figure 6F:
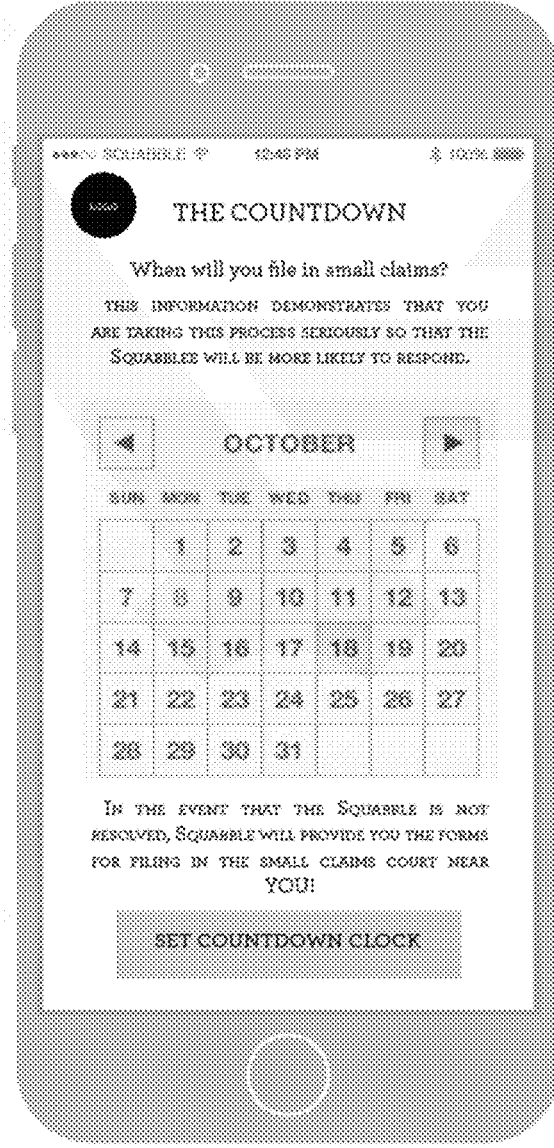
FIG. 6F is a screen showing a count-down clock for initiating a lawsuit in the court.

FIG. 6F is a screen showing a count-down clock for initiating a lawsuit in the court. The trigger date or delay period is selectable by the Squabbler.

Several follow-along questionnaire pages, as needed, are understood to be a design choice. Therefore, variations or modifications for these and follow-along questionnaire pages, are within the purview of one of ordinary skill in the art and are understood to be within the scope of this disclosure.

In a prototype embodiment, to initiate a Dispute ("Start a Squabble") involves the User clicking on "Start a Squabble" and the User/Squabbler thereafter entering pertinent information about his or her dispute including:
 Squabbler's and Squabblee's addresses (if known)
 email addresses (if known) and
 phone numbers,
 what the Squabbler claims to be owed, and
 why he is owed that amount
 (—AND—)
 upload core evidence (documents, photos, recordings, etc.) to support his or her position.

Upon completion of fact intake, the Squabbler can click "Submit Your Squabble", which accomplishes at least two things: It sends a notice to the Squabblee—AND—it places the Squabble in the cue to be selected by authorized mediators.

FIG. 7A is a screen shot of an exemplary notification page to the Defendant/Squabblee via email. The notification page can be restricted to only provide preliminary information, or can be devised to provide the full set of dispute details. However, for maximum control of the exchange, preliminary information may be the desired approach wherein the recipient is required to download the Squabble app or go to the Squabble link. For example, in a prototype embodiment the Squabblee is emailed and texted a notice of the Squabble, and is informed of the Squabbler's position and his intention to file a lawsuit should he or she not reply and engage in the Squabble. In that email and text message, the Squabblee has an option to click "Join My Squabble", which prompts the Squabblee to download the Squabble app or visit the Squabble website if he or she decides to participate in the mediation.

Figure 7B:
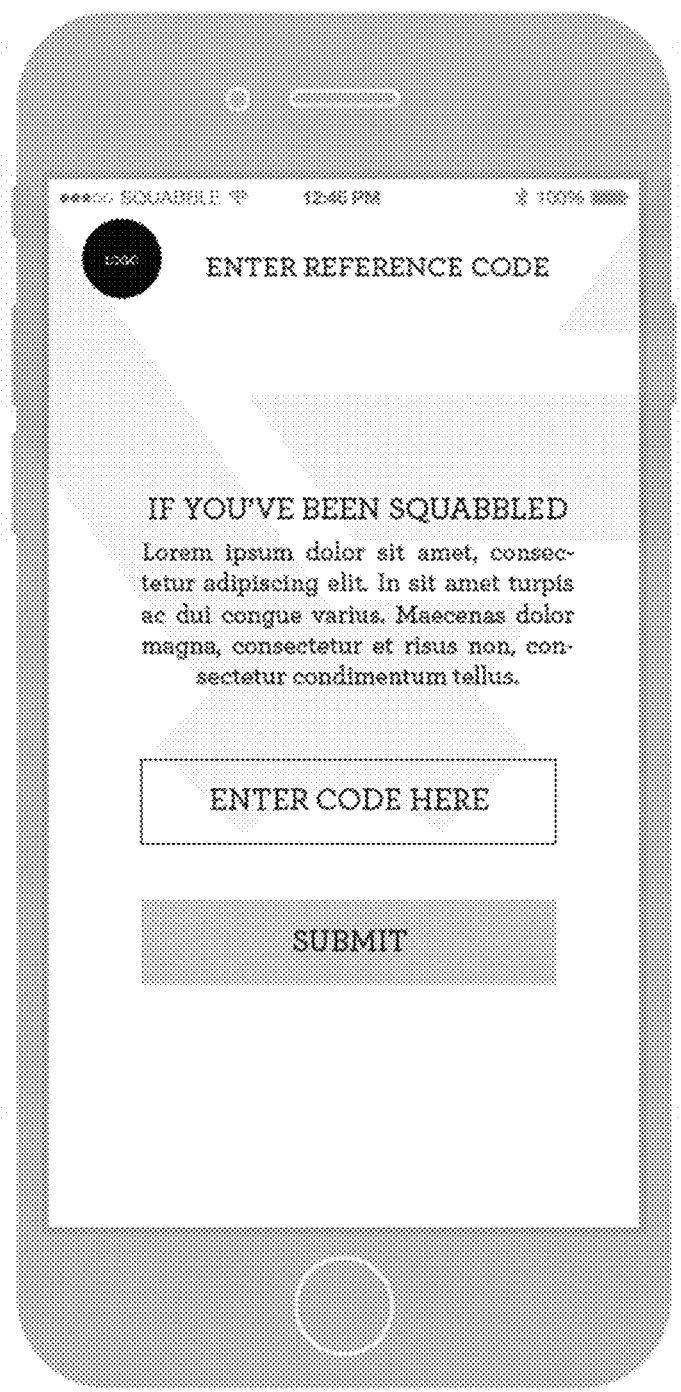
FIG. 7B is a screen shot of an exemplary notification/login page to the Defendant/Squabblee under the Squabble app.

FIG. 7B is a screen shot of an exemplary notification/login page to the Defendant/Squabblee under the Squabble app.

If the Squabblee desires to merely defend and mediate the Squabble, the Squabblee can enter his or her information and upload core evidence supporting his or her view—AND/OR—if the Squabblee feels he or she is actually the one owed money or instead, the Squabblee can click "Counter Squabble" and initiate the same process against the Squabbler that the Squabbler had initiated against the Squabblee. As stated above, if this option is selected, both the Squabbler's initial Squabble and the Squabblee's Counter Squabble can be joined into the same mediation and the dispute will be mediated by the same authorized mediator.

Figure 8A:
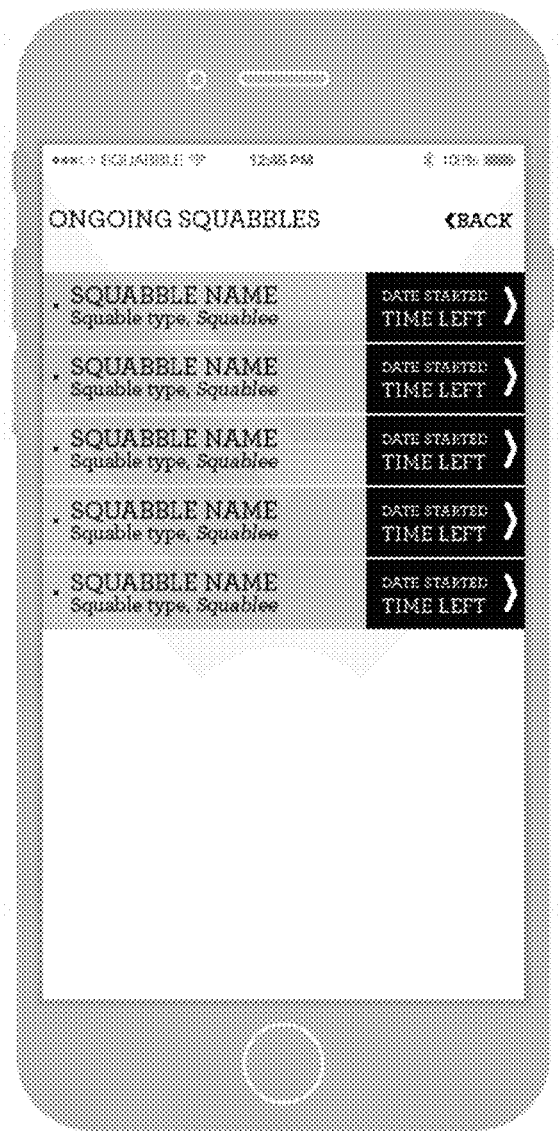
FIG. 8A is an illustration of a screen shot of a mediator's page, listing his on-going cases.

FIG. 8A is an illustration of a screen shot of a mediator's page, listing his on-going cases.

Figure 8B:
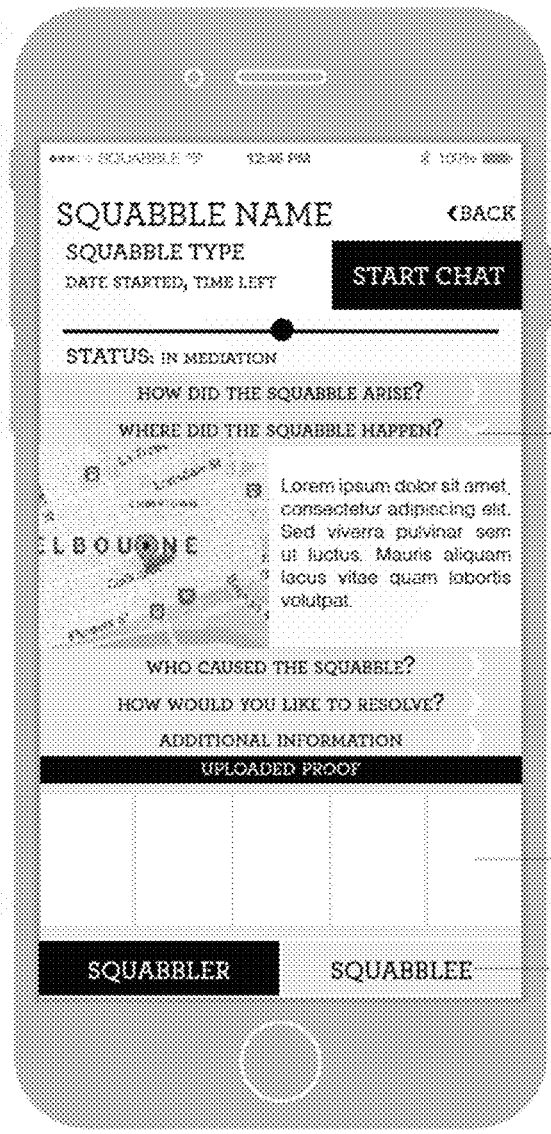
FIG. 8B is an illustration of a screen shot of a mediator's page, listing details of a case he is mediating.

FIG. 8B is an illustration of a screen shot of a mediator's page, listing details of a current case he is mediating.

FIG. 9A is an illustration of a screen shot of a suggested offer shown to the either the Squabbler or Squabblee, with a comment window from the Mediator.

FIG. 9B is an illustration of a screen shot of a follow-negotiation page listing the counter offer.

Figure 9C:
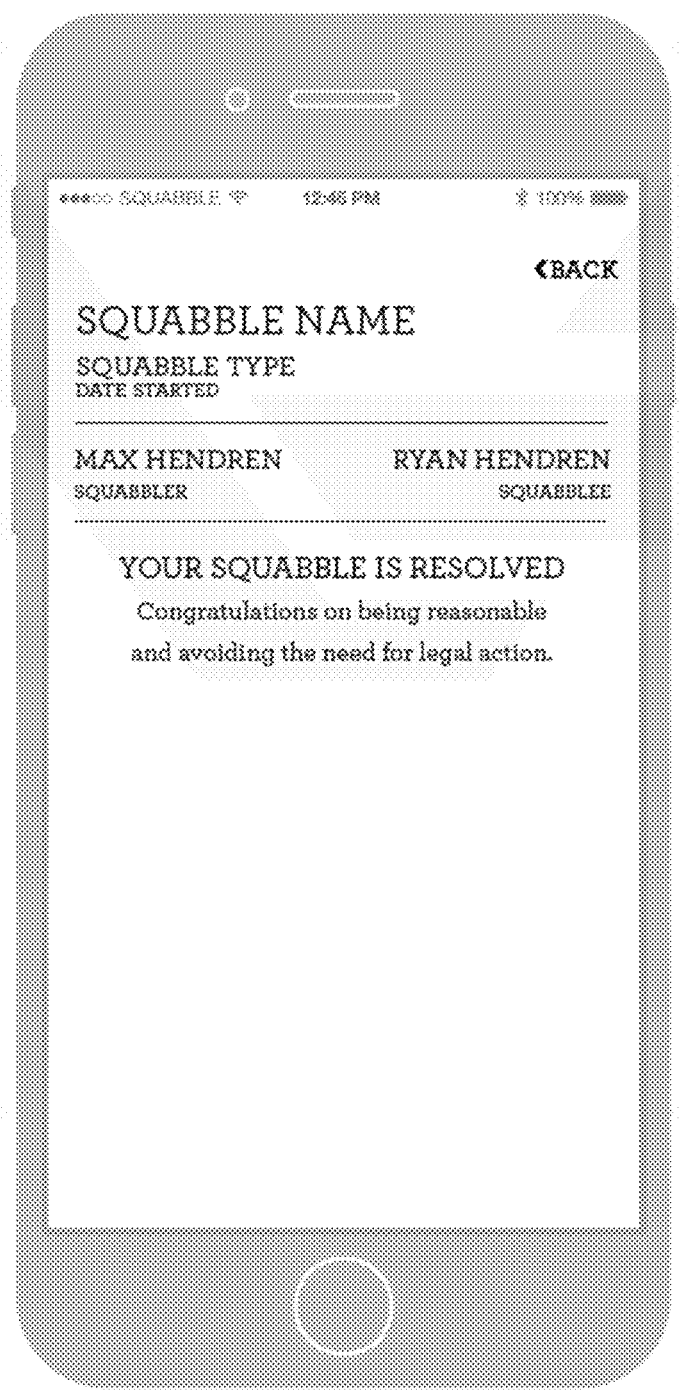
FIG. 9C is an illustration of a screen shot showing agreement between the parties.
Figure 10:
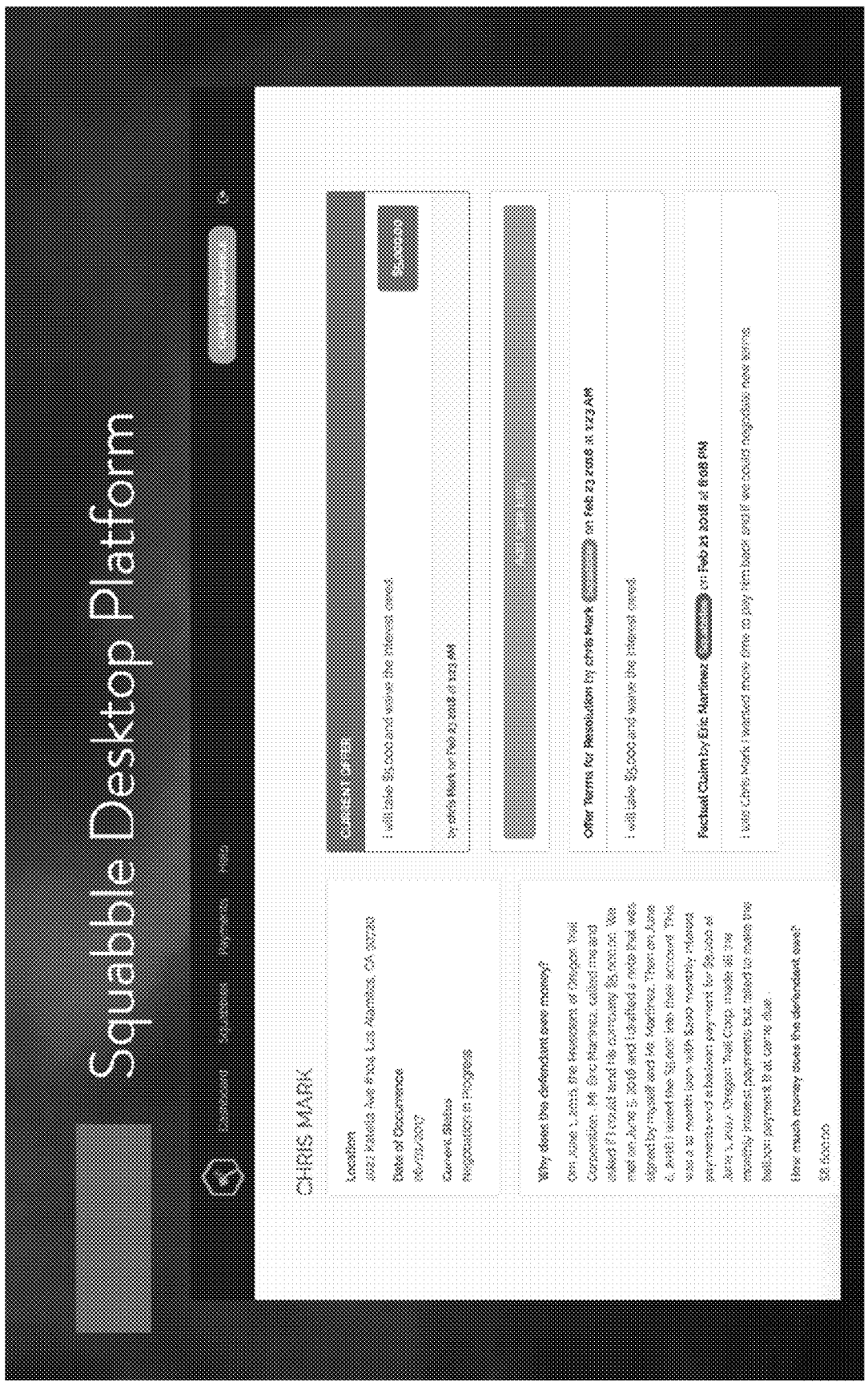
FIG. 10 is a screen shot of an exemplary web-based Squabble application.

FIG. 9C is an illustration of a screen shot showing agreement between the parties FIG. 10 is a screen shot of an exemplary web-based Squabble application, and is provided to illustrate an alternative portal.

Given the FIGS., it should be understood that the software component portions of the modules, functions, steps, or operations of Squabble process, may be written in any computer language and may be a portion of a monolithic code base, or may be developed in more discrete code portions such as is typical in object-oriented computer languages. In addition, the modules may be distributed across a plurality of computer platforms, servers, terminals, and the like. A given module may even be implemented such that the described functions are performed by separate processors and/or computing hardware platforms. Additionally, the logical blocks, modules, circuits, and algorithm steps described in connection with the embodiments disclosed herein may be implemented as electronic hardware, computer software, or combinations of both. Thus, the steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium is coupled to the processor such that the processor can read non-transitory information from, and write non-transitory information to, the storage medium.

It is to be understood that this disclosure is not limited to particular methods, implementations, and realizations, which can, of course, vary. It is also to be understood that the terminology used herein is for the purpose of describing particular embodiments only, and is not intended to be limiting. Thus, the various aspects and embodiments disclosed herein are for purposes of illustration and are not intended to be limiting, as delimited by the appended claims.

What is claimed is:

1. A method for semi-automatic conflict resolution management and communication, comprising:
    hosting a mediation and management application on one or more cloud-networked servers;
    presenting via at least one of a downloaded app and web-link, a digital conflict input interface to at least one of a smart device and computer to a complainant, the digital conflict input interface comprising a plurality of screens displaying a plurality of fields and a plurality of buttons;
    receiving input information via the plurality fields on the plurality of screens of the digital conflict input interface, the input information comprising information of the complainant's identification data from the complainant, conflict incident data from the complainant, and defendant identification data from the complainant, wherein the input information presents a case for an impending law suit, and wherein the digital conflict input interface includes an option to have the law suit automatically e-filed into a court's server by the application after at least one of a pre-determined period of time or date designated by the complainant, wherein the plurality of screens advance via the plurality of buttons;
    uploading the input information from the complainant into the one or more cloud-networked servers;
    forwarding at least one of an email, text message, phone call, and format for a letter to be mailed or officially served, a notice of the impending law suit to the defendant with the at least one pre-determined period of time or date of the e-filing, and digitally presenting an option to have the impending law suit mediated through the application,
    if the mediation option is selected by the defendant, then:
        presenting a digital conflict response interface to the defendant;
        receiving via a plurality fields on a plurality of screens of the digital conflict response interface response information input by the defendant;
        uploading the response information from the defendant into the one or more cloud-networked servers;
        presenting to the defendant via the digital conflict response interface a digital option to counter-claim against the complainant;
        posting in a digital private list, a summary of the uploaded information,
    wherein mediators can electronically review at least the summary and facts of the case;
        receiving a case selection by a mediator; and
        providing digital communication interfaces between the mediator and the complainant and between the mediator and the defendant on their respective devices, to facilitate a settlement between parties,
    wherein communication between the complainant and defendant is not permitted through the application.

2. The method of claim 1, further comprising providing a digital settlement template to the mediator, upon settlement by the parties.

3. The method of claim 1, wherein the mediator is from a pool of crowd-sourced mediators.

4. The method of claim 1, further comprising setting time limits for performing at least one of completing information input, responding to a mediator, providing additional facts, and requesting suspension of mediation.

5. The method of claim 1 further comprising compensating a meditator depending on proceeds from the settlement.

6. The method of claim 4, further comprising managing payment of the settlement through the application.

7. The method of claim 1, further comprising:
    automatically assigning the case into one of three tiers based on a monetary amount requested by the complainant; and
    automatically designating mediators with different levels of qualifications to different tiers.

8. The method of claim 6, wherein a mediator's compensation is based on the tier of the case.

9. The method of claim 1 further comprising providing a validation of one or more of the input information.

10. The method of claim 1, wherein, if the defendant options to counter-claim against the complainant, then:

presenting via at least one of a downloaded app and web-link, a digital counter-claim input interface to at least one of a smart device and computer to the defendant;

receiving via the digital counter-claim input interface, information of the counter-claim incident data from the defendant, wherein the counter-claim input information presents a case for a counter-claim law suit;

uploading the counter-claim input information to the one or more cloud-networked servers; and notifying the complainant of a counter-claim via an electronic notification interface to the complainant.

11. The method of claim 1, wherein if the defendant selects the mediation option offered by the application by the pre-determined period of time or date, then not e-filing the input information as a formal law suit into the court's server by the application.

12. The method of claim 10, wherein after the e-filing, sending a second notice indicating the filing of the law suit to the defendant and digitally presenting an additional option to have the filed law suit mediated through the application.

13. The method of claim 11, wherein if mediation is successful and a settlement is reached, then e-filing a dismissal of the law suit into the court's server.

14. The method of claim 1, wherein the court is a small claims court.

15. A semi-automatic conflict resolution management and communication system, comprising:

means for hosting a mediation and management application on a network cloud;

means for presenting a digital conflict input interface to at least one of a smart device and computer to a complainant, the digital conflict input comprising a plurality of screens displaying a plurality of fields and a plurality of button;

means for receiving input information via the plurality fields on the plurality of screens of the digital conflict input interface, the input information comprising information of the complainant's identification data from the complainant, conflict incident data from the complainant, and defendant identification data from the complainant, wherein the input information presents a case for an impending law suit, wherein the plurality of screens advance via the plurality of buttons;

means for receiving at least one of a time period or date from the complainant for automatically e-filing the case into a court's server by the application;

means for uploading the input information from the complainant to the one or more cloud-networked servers;

means for providing notice of the impending law suit to the defendant and at least one of the time period or date of the e-filing, and digitally presenting an option to have the impending law suit mediated through the application, if the mediation option is selected by the defendant, then:
means for receiving via a plurality fields on a plurality of screens of the digital conflict response interface response information input by the defendant;
means for uploading the response information from the defendant into the one or more cloud-networked servers;
means for presenting to the defendant via the digital conflict response interface a counter-claim option against the complainant;

means for providing a summary of the uploaded information, wherein mediators can electronically review at least the summary and facts of the case;
means for selecting a case by a mediator; and
means for communication between the mediator and the complainant and between the mediator and the defendant on their respective devices, to facilitate a settlement between parties, wherein communication between the complainant and defendant is not permitted through the application.

16. A semi-automatic conflict resolution management and communication system, comprising:

a cloud-networked server hosting a mediation and management application;

a complainant's computerized device running a first device-side interface of the application comprising a digital conflict input interface comprising a first plurality of screens displaying a first plurality of fields and a first plurality of buttons, wherein information input by the complainant via the first plurality fields on the first plurality of screens of a potential law suit between the complainant and a defendant and at least one of a desired time period or date to e-file the law suit, is forwarded to the server, wherein the first plurality of screens advance via the first plurality of buttons;

the defendant's computerized device running a second device-side interface of the application comprising a digital conflict response interface comprising a second plurality of screens displaying a second plurality of fields and a second plurality of buttons, wherein a notification of the potential law suit, the at least one desired time period or date of the law suit's e-filing, a first response option to proceed with mediation, and a second response option to counter-claim against the complainant is provided to the defendant via the second plurality of fields and the second plurality of buttons the second device-side interface comprising the digital conflict response interface;

a mediator's computerized device running a third device-side interface of the application, wherein information of the potential law suit, the complainant, and the defendant are viewable via the third device-side interface, and wherein the third device-side interface contains communication windows between the mediator and the complainant and between the mediator and the defendant, wherein communication information between parties is forwarded to the server.

17. The system of claim 16, further comprising a digital private list of a summary of the potential law suit, the list being viewable on the third device-side interface.

18. The system of claim 16, wherein the first device-side interface includes a timeline option to file a law suit for selection by the complainant.

19. The system of claim 16, wherein the mediator is from a pool of crowd-sourced mediators.

20. The system of claim 16, wherein if the defendant elects to counter-claim, the second device-side interface further comprises a digital counter-claim input interface, wherein counter-claim input information by the defendant is uploaded to the one or more cloud-networked servers and the complainant is electronically notified of the counterclaim via the application.

* * * * *